(12) United States Patent
Seko et al.

(10) Patent No.: US 11,578,194 B2
(45) Date of Patent: Feb. 14, 2023

(54) THICKENING COMPOSITION IMPROVED IN VISCOSITY DEVELOPMENT

(71) Applicant: TAIYO KAGAKU CO., LTD., Yokkaichi (JP)

(72) Inventors: Yoshinori Seko, Yokkaichi (JP); Tomohiro Kimura, Yokkaichi (JP); Shuji Nishikawa, Yokkaichi (JP); Yohei Taniyama, Yokkaichi (JP)

(73) Assignee: Taiyo Kagaku Co., Ltd., Yokkaichi (JP)

( * ) Notice: Subject to any disclaimer, the term of this patent is extended or adjusted under 35 U.S.C. 154(b) by 509 days.

(21) Appl. No.: 15/850,952

(22) Filed: Dec. 21, 2017

(65) Prior Publication Data

US 2018/0371212 A1 Dec. 27, 2018

Related U.S. Application Data

(62) Division of application No. 12/376,616, filed as application No. PCT/JP2007/055242 on Mar. 15, 2007, now abandoned.

(30) Foreign Application Priority Data

Aug. 16, 2006 (JP) .............................. JP2006-221951

(51) Int. Cl.
*C08L 5/00* (2006.01)
*A23L 29/269* (2016.01)
*A23L 2/52* (2006.01)

(52) U.S. Cl.
CPC .................. *C08L 5/00* (2013.01); *A23L 2/52* (2013.01); *A23L 29/27* (2016.08)

(58) Field of Classification Search
CPC ............... A23L 2/52; A23L 29/27; C08L 5/00
See application file for complete search history.

(56) References Cited

U.S. PATENT DOCUMENTS

| 4,487,866 A | 12/1984 | Almond et al. |
| 5,612,023 A | 3/1997 | Diehl |

(Continued)

FOREIGN PATENT DOCUMENTS

| EP | 319129 | 6/1989 |
| EP | 607002 | 7/1994 |

(Continued)

OTHER PUBLICATIONS

"Fluid Bed Systems" Available online at www.glatt.com on Apr. 22, 2005. (Year: 2005).*

(Continued)

*Primary Examiner* — Erik Kashnikow
*Assistant Examiner* — Assaf Zilbering
(74) *Attorney, Agent, or Firm* — K&L Gates LLP

(57) ABSTRACT

A thickening composition contains xanthan gum having per 100 parts by weight thereof, at least 0.5 parts by weight or more of metal salt bound on the surface of xanthan gum powder. This thickening composition is capable of convenient viscosity development by addition to water-containing objects. Thus, the thickening composition is suitable for use in, for example, food applications for convenient thickening of soft drinks, basting, sauce, dressing, soup, mousse, jelly, or the like, or application for viscosity development by addition of a small amount thereof to meals for patients having difficulty in mastication/swallowing, for example due to eating disorder.

4 Claims, 1 Drawing Sheet

(56) References Cited

U.S. PATENT DOCUMENTS

| | | | | |
|---|---|---|---|---|
| 5,612,026 | A | * | 3/1997 | Diehl .................. A23L 2/52 424/401 |
| 5,633,028 | A | | 5/1997 | Wong |
| 5,633,030 | A | | 5/1997 | Marrs et al. |
| 5,942,550 | A | | 8/1999 | Diehl |
| 2002/0038019 | A1 | | 3/2002 | Bousman et al. |
| 2007/0172568 | A1 | | 7/2007 | Spelman |

FOREIGN PATENT DOCUMENTS

| | | |
|---|---|---|
| JP | 2003-104912 | 4/2003 |
| JP | 2005-333885 | 12/2005 |
| JP | 2006-271258 | 10/2006 |
| JP | 2010204408 | 9/2010 |
| WO | 9308704 | 5/1993 |
| WO | 2004069179 | 8/2004 |
| WO | 2006/095756 | 9/2006 |

OTHER PUBLICATIONS

McCullough et al., "National Dysphagia Diet: What to Swallow". The ASHA Leader, vol. 8, Issue 20, Nov. 2003, pp. 16-27 (Year: 2003).*

Grenus "Using Agglomeration". Available online at www.naturalproductsinsider.com (Year: 2004).*
Garcia et al., "Thickened Liquids: Practice Patterns of Speech-Language Pathologists". American Journal of Speech-Language Pathology vol. 14(1) pp. 4-13. (Year: 2005).*
Spieker., "Evaluating Dysphagia". Am Fam Physician. Jun. 15, 2000;61(12): 3639-3648 (Year: 2000).*
Yeh et al., "Influence of Calcium Lactate on the Fate of Spoilage and Pathogenic Microorganisms in Orange Juice". Journal of Food Protection, vol. 67, No. 7, 2004, pp. 1429-1432. (Year: 2004).*
Nishikawa, et al., "Zonen Anteizai Shijo no Genjo to Tenbo," Food chemicals, Aug. 2003, vol. 19, No. 8, pp. 37-41.
Yeh et al. "Influence of Calcium Lacatte on the Fate of Spoilage and Pathogenic Microorganisms in Orange Juice". Journal of Food Protection, vol. 67, No. 7 2004, pp. 1429-1432.
Grenus., "Using Agglomeration". Available online at www.naturalproductsinsider.com on Jul. 2004.
"Fluid bed systems". Available online at www.glatt.com on Apr. 22, 2005.
"Potassium Citrate". Available online at www.adm.com on Sep. 23, 2007.
International Search Report—PCT/JP2007/055242 dated Apr. 10, 2007 (translation), 2 pages.
Written Opinion of the International Searching Authority—PCT/JP2007/055242 dated Apr. 10, 2007 (translation), 5 pages.
Takenawa et al., JP 10-20440, English Absract.

* cited by examiner

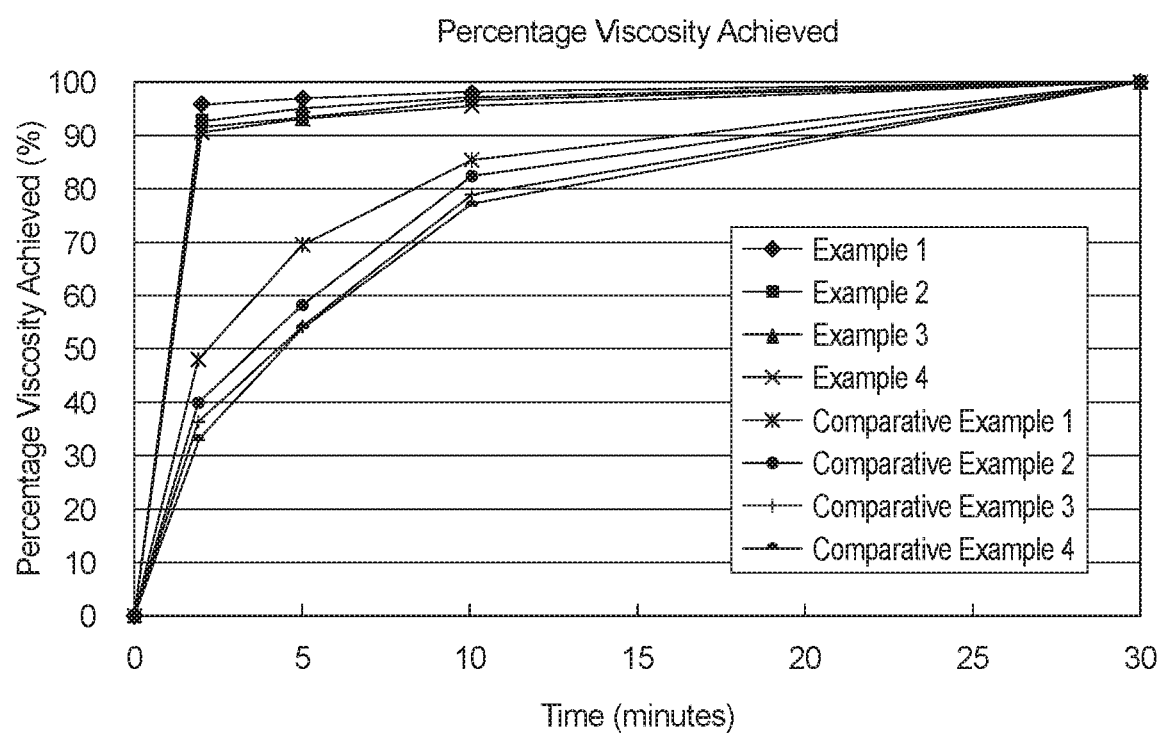

THICKENING COMPOSITION IMPROVED IN VISCOSITY DEVELOPMENT

PRIORITY CLAIM

This application is a divisional of U.S. application Ser. No. 12/376,616 filed May 17, 2010, which is a National Stage of International Application No. PCT/JP2007/055242 filed Mar. 15, 2007, which claims priority to Japanese Patent Application No. JP-2006-221951 filed Aug. 16, 2006, the entire contents of which are incorporated herein by reference.

FIELD OF THE INVENTION

The present invention relates to compositions for thickening, wherefrom viscosity is readily developed by addition to a target substance which contains water; and the present invention particularly relates to compositions for thickening which improve the development of viscosity when they are utilized for foodstuff applications, whereby there may be readily thickened, for example, soft drinks, dips, sauces, dressings, soups, mousses and jellies, and when they are utilized for applications whereby viscosity is developed by the addition of small quantities, to, for example, foodstuffs for patients who have chewing and swallowing difficulties due to eating disorders.

DESCRIPTION OF THE RELATED ART

Xanthan gums are soluble in cold water and the solutions obtained display strong pseudoplastic viscosity. It is considered that the solutions form weak networks resembling gels and, for this reason, they have very superior dispersion and emulsion-stabilizing properties for insoluble solid fractions or fats and oils. In addition, they have excellent heat resistance, acid resistance and freezing resistance. Due to their high resistance to various factors, they are used in various industrial fields, such as foodstuffs, cosmetics and pharmaceuticals.

In order to use a xanthan gum effectively, it is first necessary to completely hydrate it: initial viscosity is developed by complete hydration. In general, when consumers use xanthan gum in foodstuffs or the like, only the surface of the xanthan gum dissolves and powder remains inside: a so-called "lumpy" state is readily produced and the xanthan gum which has become lumpy is incompletely hydrated, so that a state is readily produced whereby it is impossible for the xanthan gum to display its function.

The rate of development of viscosity when xanthan gum is hydrated is more rapid as the particle size of the xanthan gum is decreased and there is a tendency towards a slowing of the rate as the particle size is increased. In addition, xanthan gum wherein the particle size is finer has a larger surface area and, since there are properties whereby lumps are markedly readily produced when the gum is dispersed in water, it is necessary to have utensils for dispersion and dissolution, in order to produce complete hydration. In this manner, there are difficulties associated with verifiably dispersing and dissolving xanthan gum in this manner.

Known conventional techniques for dispersing and dissolving a xanthan gum in water, are a technique whereby the xanthan gum is dispersed in ethanol, and dispersed in a target substance, such as water, and a process whereby a xanthan gum is vigorously agitated, using an agitation and dispersion device, such as a Disper, so that it dissolves without forming lumps. This is the process used industrially, which requires a certain degree of skill, and is difficult to carry out in an environment wherein there is no such equipment, such as a household.

A technique has also been published, (for example, Patent Reference 1), whereby solubility is improved by granulating water-soluble polysaccharides and emulsifying agents as binder solutions, but lumps are produced by the supply process; in addition, xanthan gums may not always be readily soluble, and there is also a desire for compositions which rapidly disperse and dissolve, and wherefrom the desired viscosity may be obtained readily.

SUMMARY

The present invention relates to: [1] Compositions for thickening, wherein is contained xanthan gum, with 0.5 parts by weight or more of a metal salt, per 100 parts by weight of xanthan gum, being bound to the surface of a powder of the said xanthan gum; and [2] beverages and foodstuffs containing the compositions for thickening according to the aforementioned [1].

BRIEF DESCRIPTION OF THE DRAWING

FIG. 1 is a diagram to illustrate the percentage viscosities achieved for Examples 1 to 4 and Comparative Examples 1 to 4.

DETAILED DESCRIPTION

Compositions which can rapidly develop the desired viscosity without producing lumps, as with conventional powders, are sought. Of these, such properties are strongly desired for xanthan gum, to impart thickness to therapeutic foods and training foods, particularly for persons having difficulty with chewing and swallowing. An object of the present invention is to provide compositions for thickening which can significantly reduce processing times for consumers, by being able to rapidly develop viscosity, when small quantities are added to target substances containing water.

The present inventors, taking account of such conditions and, as a result of carrying out diligent investigations to improve properties for the development of viscosity and enhance solubility, targeted at the point where, when xanthan gum is dissolved, dissolution is controlled by means of the concentration of salts, discovered: that metal salts will bind to the surface of xanthan gum; that the dissolution of the surface is controlled by modifying the surface of xanthan gum, by, for example, spray drying a metal salt solution; and that xanthan gum which has been dispersed in water, by markedly improving the dispersion properties of xanthan gum in water, rapidly develops viscosity. This phenomenon was inferred to be due to the binding of metal salts to the surface of xanthan gum: no effects to improve the development of viscosity were seen with simply powdering and mixing metal salt powders with xanthan gum.

It is possible to enhance the wetting of the surface of xanthan gum with water by binding a metal salt to the surface of a xanthan gum powder, to markedly improve its dispersion in water, and to markedly improve the rate of attaining peak viscosity.

According to the present invention, metal salts are used which may be added to xanthan gum, which is permitted as a food additive, and to foodstuffs, pharmaceuticals or the like.

The xanthan gum according to the present invention is a natural gum from the fermentation of glucose by the microorganism Xanthomonas campestris: the polysaccharide which accumulates extracellularly is purified and powdered.

The metal salts according to the present invention are not particularly restricted, as long as there is at least 1 salt selected from a group which comprises: potassium salts, sodium salts, calcium salts and magnesium salts, which are generally used for foodstuffs or the like.

The potassium salts are not particularly restricted, as long as there is at least 1 salt selected from a group which comprises: potassium chloride, monopotassium citrate, tripotassium citrate, potassium hydrogen DL-tartrate, potassium L-hydrogen tartrate, potassium carbonate, tetrapotassium pyrophosphate, potassium poly-phosphate, potassium metaphosphate, tripotassium phosphate, dipotassium hydrogen phosphate, potassium dihydrogen phosphate, potassium sulfate, potassium hydrogen sulfite, potassium gluconate, potassium L-glutamate, potassium acetate, potassium bromide, potassium bromate, potassium nitrate and potassium sorbate; however, since potassium salts have a characteristic bitter taste, it is best to add them so that the quantities bound are those to be described hereafter.

The sodium salts are not particularly restricted, as along as there is at least 1 salt selected from a group which comprises: sodium benzoate, sodium chloride, sodium ferrous citrate, trisodium citrate, sodium gluconate, sodium L-glutamate, sodium acetate, sodium bromide, sodium hydrogen carbonate, sodium potassium tartrate, sodium hydrogen tartrate, sodium DL-tartrate, sodium L-tartrate, sodium nitrate, sodium carbonate, sodium lactate, tetrasodium pyrophosphate, disodium dihydrogen pyrophosphate, sodium fumarate, sodium polyphosphate, sodium metaphosphate, sodium hydrogen sulfite, sodium nitrate, disodium hydrogen phosphate, sodium dihydrogen phosphate and trisodium phosphate.

The calcium salts are not particularly restricted, as along as there is at least 1 salt selected from a group which comprises: calcium chloride, calcium citrate, calcium gluconate, calcium L-glutamate, calcium acetate, calcium oxide, non-calcinated bone calcium, calcium hydroxide, calcium carbonate, calcium lactate, calcium dihydrogen pyrophosphate, calcium sulfate, tricalcium phosphate, calcium monohydrogen phosphate and calcium dihydrogen phosphate.

The magnesium salts are not particularly restricted, as along as there is at least 1 salt selected from a group which comprises: magnesium chloride, magnesium L-glutamate, magnesium oxide, magnesium carbonate and magnesium sulfate.

Of these salts, potassium chloride, monopotassium citrate, tripotassium citrate, trisodium citrate, sodium chloride, calcium lactate and magnesium chloride are preferred, and potassium chloride is particularly preferred, from the viewpoint of further improving dissolution properties.

The binding according to the present invention describes the particle binding condition of metal salts to the surfaces of xanthan gum particles; the metal salts are in crystalline form and their particles bind to the surfaces of xanthan gum particles, that is, there are included binding of metal salts as binders to the surfaces of xanthan gum particles and binding of the salts as coating agents. To be specific: particle binding is maintained even with vibrating for 30 seconds on a 60-mesh sieve and it is preferable to have 20% by weight or less, more preferably 15% by weight or less, yet more preferably 10% by weight or less, of fine powder from disintegration due to vibration which will pass through a 60-mesh sieve. In addition, the sizes of the xanthan gum and metal salt particles are generally both finer than 60 mesh so that, when the powder from simply mixing xanthan gum and a metal salt powder is sifted with a 60-mesh sieve, 100% of the theoretical quantity of powder passes through the sieve.

The processes for binding are not particularly limited: examples which may be given are a process whereby xanthan gum and metal salt particles are bound by wetting and a process whereby a metal salt solution is uniformly sprayed onto xanthan gum powder and dried; it is preferable to carry out drying after spraying of the metal salt solution onto the xanthan gum by means of fluidized drying, from the viewpoint of uniform binding of the metal salt to the xanthan gum. The fluidized drying process is not particularly limited, but it is desirable to carry out the fluidized drying after spraying a from 1% to 20% by weight aqueous solution of a metal salt as a binder. The quantity of a metal salt to bind is unrelated to the valence of the metal: the xanthan gums contained in the compositions according to the present invention are bound with 0.5 parts by weight or more of a metal salt, per 100 parts of xanthan gum, but if there is less than 0.5 parts by weight the quantity of metal salt bound is too low and there is no promotion of viscosity development. In addition, since when 10 parts by weight are exceeded, hygroscopicity increases, this delays the development of viscosity. From these viewpoints, it is preferable to bind 0.5 parts by weight or more to 10 parts by weight or less, more preferably 0.5 parts by weight or more to 7 parts by weight or less, of a metal salt to 100 parts by weight of xanthan gum. In addition, when the metal salt is a potassium salt, it is preferable to bind 0.5 parts by weight or more to 10 parts by weight or less, more preferably 0.5 parts by weight or more to 7 parts by weight or less, to 100 parts by weight of xanthan gum, of a potassium salt, from the viewpoint of the characteristic bitter taste of potassium salts.

The peak viscosity according to the present invention is the numerical value of the viscosity developed when xanthan gum is dispersed and dissolved under ideal conditions. To be specific: when a fixed quantity of a xanthan gum is dispersed and dissolved, the viscosity is seen to have a tendency to rise with the time that elapses from immediately after introducing the xanthan gum into water, but this increasing tendency is no longer observed after a set time has elapsed: the viscosity at this point is taken to be the peak viscosity. For example, when xanthan gum (1 g) is added to water (99 g) at 20° C. and stirred for a set time (30 seconds, 600 rpm), the viscosity starts to rise and, when 30 minutes have elapsed, it stabilizes at a fixed level. This viscosity is termed the "peak velocity". According to the present invention, when a xanthan gum which has been bound to a metal salt is used, the time required until at least 90% of the peak viscosity has been reached after addition is within 2 minutes, and the actual operating time for a consumer to manufacture a thickening agent by hand-stirring is significantly reduced compared with that for a granular xanthan gum which has not been surface treated, when the time required until at least 90% of the peak viscosity has been reached after addition may be 10 minutes or more. In addition, when a comparison is made of xanthan gums whereto metal salts have been bound with granular xanthan gums which have not been surface treated, it is possible to appreciate that, in fact, viscosity has rapidly developed, because there is dispersion and dissolution without forming lumps.

The compositions for thickening according to the present invention are not particularly limited, as long as they contain xanthan gums modified by binding with metal salts, but at least 1 substance may be used, selected from, for example, guar gum, enzyme-degraded guar gum, carrageenan, karaya gum, sodium carboxymethylcellulose (CMC), sodium alginate, modified starch and dextrin. The dextrins which are used are not particularly restricted, but, from the viewpoint of dispersibility, a dextrose equivalent (DE) from 6 to 30 is preferable and from 6 to 25 is more preferable.

In addition, according to the present invention, beverages and foodstuffs are provided which contain the aforementioned compositions for thickening. The beverages and foodstuffs are not particularly restricted, as long as they contain compositions for thickening according to the present invention, and, in addition, the contents thereof are not particularly restricted. The beverages and foodstuffs may be manufactured by adding suitable compositions according to the present invention by processes for manufacture known to those skilled in the art.

EXAMPLES

The present invention will be described by giving specific embodiment Examples of its execution, but the present invention will not be limited by the following Examples. The xanthan gums used in the Examples and the Comparative Examples contain, as salts, potassium (1000 mg), sodium (2400 mg), calcium (60 mg) or magnesium (40 mg) in 100 g of gum.

Example 1

<Manufacture of Binder Solution> A potassium chloride solution was manufactured by stirring and dissolving potassium chloride (5 g) in ion-exchanged water (95 g) at 50° C.

<Spraying Process> Xanthan gum (100 g) was maintained in a fluid state and sprayed with a potassium chloride solution (50 g). A xanthan gum composition (94.3 g) was obtained by fluidized drying of the granules obtained after spraying had finished. The composition was filled to the 100 ml level in a container of that capacity and the weight of the filled granules was determined. The weight of the granules was 41 g and the bulk specific gravity thereof was 0.41 g/ml. In addition, the results of ascertaining the degree of binding of the granules by vibrating the granules obtained (20 g) for 30 seconds on a Japanese Industrial Standard (JIS) 150 mm internal diameter 60-mesh sieve (Octagon 200, manufactured by (K K) Iida Seisakusho; vibration width 2 to 3 mm, 3600 vibrations/minute) were that 2.04 g of the 20 g of powder passed through 60 mesh and the percentage of xanthan gum with a low degree of binding to potassium chloride was 10.2% by weight. It was verified that the remaining 89.8% by weight was bound. On the other hand, the potassium contents of 100 g of each of the granules after fluidized drying, the granules which remained on the 60-mesh sieve and the powder which passed through 60 mesh were determined by means of atomic absorption spectrometry. The results were that, per 100 g of xanthan gum, the potassium contents in the granules and powder were, respectively: 1600 mg in the granules after fluidized drying; 1600 mg in the granules which remained on the 60-mesh sieve (when the potassium contained in the xanthan gum (1000 mg) was deducted, the quantity of potassium salt bound was 600 mg: the quantity bound per 100 parts by weight of xanthan gum was 0.6 parts by weight]; and 1600 mg in the powder which passed through 60 mesh: it was ascertained that potassium had uniformly bound to the afore-mentioned xanthan gum composition.

Example 2

<Manufacture of Binder Solution> A sodium chloride solution was manufactured by stirring and dissolving sodium chloride (5 g) in ion-exchanged water (95 g) at 50° C.

<Spraying Process> Xanthan gum (100 g) was maintained in a fluid state and sprayed with a sodium chloride solution (50 g). A xanthan gum composition (93.1 g) was obtained by fluidized drying of the granules obtained after spraying had finished. The composition was filled to the 100 ml level in a container of that capacity and the weight of the filled granules was determined. The weight of the granules was 46 g and the bulk specific gravity thereof was 0.46 g/ml. In addition, the results of ascertaining the degree of binding of the granules obtained (20 g) in a similar manner to Example 1 were that 2.26 g of the 20 g of powder passed through 60 mesh and the percentage of xanthan gum with a low degree of binding to sodium chloride was 11.3% by weight. It was verified that the remaining 88.7% by weight was bound. On the other hand, the sodium contents of the granules after fluidized drying, the granules which remained on the 60-mesh sieve and the powder which passed through 60 mesh were each determined by means of atomic absorption spectrometry in a similar manner to Example 1. The results were that, per 100 g of xanthan gum, the sodium contents in the granules and powder were, respectively: 3400 mg in the granules after fluidized drying; 3400 mg in the granules which remained on the 60-mesh sieve [when the sodium contained in the xanthan gum (2400 mg) was deducted, the quantity of sodium salt hound was 1000 mg: the quantity bound per 100 parts by weight of xanthan gum was 1.0 parts by weight]; and 3400 mg in the powder which passed through 60 mesh: it was ascertained that sodium had uniformly bound to the aforementioned xanthan gum composition.

Example 3

<Manufacture of Binder Solution> A calcium lactate solution was manufactured. by stirring and dissolving calcium lactate (5 g) in ion-exchanged water (95 g) at 50° C.

<Spraying Process> Xanthan gum (100 g) was maintained in a fluid state and sprayed with a calcium 'lactate solution (50 g). A xanthan gum composition (92.8 g) was obtained by fluidized drying of the granules obtained after spraying had finished. The composition was filled to the 100 ml level in a container of that capacity and the weight of the filled granules was determined. The weight of the granules was 48 g and the bulk specific gravity thereof was 0.48 g/ml. In addition, the results of ascertaining the degree of binding of the granules obtained (20 g) in a similar manner to Example 1 were that 2.45 g of the 20 g of powder passed through 60 mesh and the percentage of xanthan gum with a low degree of binding to calcium lactate was 12.3% by weight. It was verified that the remaining 87.7% by weight was bound. On the other hand, the calcium contents of the granules after fluidized drying, the granules which remained on the 60-mesh sieve and the powder which passed through 60 mesh were each determined by means of atomic absorption spectrometry in a similar manner to Example 1. The results were that, per 100 g of xanthan gum, the calcium contents in the granules and powder were, respectively: 600 mg in the granules after fluidized drying; 600 mg in the granules which remained on the 60-mesh sieve [when the calcium contained in the xanthan gum (60 mg) was deducted, the quantity of calcium salt bound was 540 mg: the quantity bound per 100 parts by weight of xanthan gum was 0.54 parts by weight]; and 600 mg in the powder which passed through 60 mesh: it was ascertained that calcium had uniformly bound to the aforementioned xanthan gum composition.

Example 4

<Manufacture of Binder Solution> A magnesium chloride solution was manufactured by stirring and dissolving magnesium chloride (5 g) in ion-exchanged water (95 g) at 50° C.

<Spraying Process> Xanthan gum (100 g) was maintained in a fluid state and sprayed with a magnesium chloride solution (50 g). A xanthan gum composition (91.1 g) was obtained by fluidized drying of the granules obtained after spraying had finished. The composition was filled to the 100 ml level in a container of that capacity and the weight of the filled granules was determined. The weight of the granules was 49 g and the bulk specific gravity thereof was 0.49 g/ml. In addition, the results of ascertaining the degree of binding of the granules obtained (20 g) in a similar manner to Example 1 were that 2.51 g of the 20 g of powder passed through 60 mesh and the percentage of xanthan gum with a low degree of binding to magnesium chloride was 12.6% by weight. It was verified that the remaining 87.4% by weight was bound. On the other hand, the magnesium contents of the granules after fluidized drying, the granules which remained on the 60-mesh sieve and the powder which passed through 60 mesh were each determined by means of atomic absorption spectrometry in a similar manner to Example 1. The results were that, per 100 g of xanthan gum, the magnesium contents in the granules and powder were, respectively: 600 mg in the granules after fluidized drying; 600 mg in the granules which remained on the 60-mesh sieve [when the magnesium contained in the xanthan gum (40 mg) was deducted, the quantity of magnesium salt bound was 560 mg: the quantity bound per 100 parts by weight of xanthan gum was 0.56 parts by weight]; and 600 mg in the powder which passed through 60 mesh: it was ascertained that magnesium had uniformly bound to the aforementioned xanthan gum composition.

Comparative Example 1

A comparative product was manufactured under the same conditions as for Example 1, substituting the potassium chloride solution with ion-exchanged water.

<Spraying Process> Xanthan gum (100 g) and the same quantity of potassium chloride powder (2.5 g) as the potassium chloride in Example 1 were maintained in a fluid state and sprayed with ion-exchanged water (50 g). A xanthan gum composition (92 g) was obtained by fluidized drying of the granules obtained after spraying had finished: The composition was filled to the 100 ml level in a container of that capacity and the weight of the filled granules was determined. The weight of the granules was 45 g and the bulk specific gravity thereof was 0.45 g/ml. In addition, the results of ascertaining the degree of binding of the granules obtained (20 g) in a similar manner to Example 1 were that 4.18 g of the 20 g of powder passed through 60 mesh and the percentage of xanthan gum with a low degree of binding to potassium chloride was 20.9% by weight. On the other hand, the potassium contents of the granules after fluidized drying, the granules which remained on the 60-mesh sieve and the powder which passed through 60 mesh were each determined by means of atomic absorption spectrometry in a similar manner to Example 1. The results were that, per 100 g of xanthan gum, the potassium contents in the granules and powder were, respectively: 1600 mg in the granules after fluidized drying; 1400 mg in the granules which remained on the 60-mesh sieve [when the potassium contained in the xanthan gum (1000 mg) was deducted, the quantity of potassium salt bound was 400 mg: the quantity bound per 100 parts by weight of xanthan gum was 0.4 parts by weight); and 2500 mg in the powder Which passed through 60 mesh: since the potassium was not uniformly bound to the above-mentioned xanthan gum composition, it was ascertained that an excess of weakly bound potassium chloride had passed through 60 mesh.

Comparative Example 2

A comparative product was manufactured under the same conditions as for Example 2, substituting the sodium chloride solution with ion-exchanged water.

<Spraying Process> Xanthan gum (100 g) and the same quantity of sodium chloride powder (2.5 g) as the sodium chloride in Example 2 were maintained in a fluid state and sprayed with ion-exchanged water (50 g). A xanthan gum composition (91.5 g) was obtained by fluidized drying of the granules obtained after spraying had finished. The composition was filled to the 100 ml level in a container of that capacity and the weight of the filled granules was determined. The weight of the granules was 49 g and the bulk specific gravity thereof was 0.49 g/ml. In addition, the results of ascertaining the degree of binding of the granules obtained (20 g) in a similar manner to Example 2 were that 4.25 g of the 20 g of powder passed through 60 mesh and the percentage of xanthan gum with a low degree of binding to sodium chloride was 21.3% by weight. On the other hand, the sodium contents of the granules after fluidized drying, the granules which remained on the 60-mesh sieve and the powder which passed through 60 mesh were each determined by means of atomic absorption spectrometry in a similar manner to Example 2. The results were that, per 100 g of xanthan gum, the sodium contents in the granules and powder were, respectively: 3400 mg in the granules after fluidized drying; 2600 mg in the granules which remained on the 60-mesh sieve when the sodium contained in the xanthan gum (2400 g) was deducted, the quantity of sodium salt bound was 200 mg; the quantity bound per 100 parts by weight of xanthan gum was 0.2 parts by weight]; and 6200 mg in the powder which passed through 60 mesh: since the sodium was not uniformly bound to the above-mentioned xanthan gum composition, it was ascertained that an excess of weakly bound sodium chloride had passed through 60 mesh.

Comparative Example 3

A comparative product was manufactured under the same conditions as for Example 3, substituting the calcium lactate solution with ion-exchanged water.

<Spraying Process> Xanthan gum (100 g) and the same quantity of calcium lactate powder (2.5 g) as the calcium lactate in Example 3 were maintained in a fluid state and sprayed with ion-exchanged water (50 g). A xanthan gum composition (90.8 g) was obtained by fluidized drying of the granules obtained after spraying had finished. The composition was filled to the 100 ml level in a container of that capacity and the weight of the filled granules was determined. The weight of the granules was 49 g and the bulk specific gravity thereof was 0.49 g/ml. In addition, the results of ascertaining the degree of binding of the granules obtained (20 g) in a similar manner to Example 3 were that 4.38 g of the 20 g of powder passed through 60 mesh and the percentage of 'xanthan gum with a low degree of binding to calcium lactate was 21.9% by weight. On the other hand, the calcium contents of the granules after fluidized drying, the granules which remained on the 60-mesh sieve and the powder which passed through 60 mesh were each determined by means of atomic absorption spectrometry in a similar manner to Example 3. The results were that, per 100 g of xanthan gum, the calcium contents in the granules and powder were, respectively: 600 mg in the granules after fluidized drying; 400 mg in the granules which remained on the 60-mesh sieve (when the calcium contained in the xanthan gum (60 mg) was deducted, the quantity of calcium salt bound was 340 mg: the quantity bound per 100 parts by weight of xanthan gum was 0.34 parts by weight]; and 1200 mg in the powder which passed through 60 mesh: since the calcium was not uniformly bound to the above-mentioned xanthan gum composition, it was ascertained that an excess of weakly bound calcium lactate had passed through 60 mesh.

Comparative Example 4

A comparative product was manufactured under the same conditions as for Example 4, substituting the magnesium chloride solution with ion-exchanged water.

<Spraying Process> Xanthan gum (100 g) and the same quantity of magnesium chloride (2.5 g) as the magnesium chloride in Example 4 were maintained in a fluid state and sprayed with ion-exchanged water (50 g). A xanthan gum composition (90.5 g) was obtained by fluidized drying of the granules obtained after spraying had finished. The composition was filled to the 100 ml level in a container of that capacity and the weight of the filled granules was determined. The weight of the granules was 49 g and the bulk specific gravity thereof was 0.49 g/ml. In addition, the results of ascertaining the degree of binding of the granules obtained (20 g) in a similar manner to Example 4 were that 4.2 g of the 20 g of powder passed through 60 mesh and the percentage of xanthan gum with a low degree of binding to magnesium chloride was 21.0% by weight. On the other hand, the calcium contents of the granules after fluidized drying, the granules which remained on the 60-mesh sieve and the powder which passed through 60 mesh were each determined by means of atomic absorption spectrometry in a similar manner to Example 4. The results were that, per 100 g of xanthan gum, the magnesium contents in the granules and powder were, respectively: 600 mg in the granules after fluidized drying; 400 mg in the granules which remained on the 60-mesh sieve [when the magnesium contained in the xanthan gum (40 g) was deducted, the quantity of magnesium salt bound was 360 mg: the quantity bound per 100 parts by weight of xanthan gum was 0.36 parts by weight]; and −1300 mg in the powder which passed through 60 mesh: since the magnesium was not uniformly bound to the above-mentioned xanthan gum composition, it was ascertained that an excess of weakly bound magnesium chloride had passed through 60 mesh.

Test Example 1

Using a low rotation rate Disper (manufactured by Tokushu Kika Kogyo Company Limited), the granules obtained in Example 1 and in Comparative Example 1 at 20° C. were introduced (1 g at a time) into ion-exchanged water (99 g), with stirring at 600 rpm and stirring was continued for 30 seconds. The mixtures were kept for 2 minutes, 5 minutes, 10 minutes and 30 minutes and the viscosities were determined for each point in time with a Model B viscometer (manufactured by Tokyo Kiki; rotation rate, 12 rpm;, with rotor Number 3 after 30 seconds). The results of the measurements were expressed as percentage viscosities achieved, according to: "measurement result viscosity after 30 minutes×100" with the viscosity achieved after 30 minutes being taken as 100%. The measurement results for Examples 1 to 4 and for Comparative Examples 1 to 4 are listed in Table 1, and the percentage viscosities achieved are illustrated in FIG. 1.

TABLE 1

|  | Time (minutes) | | | | |
| --- | --- | --- | --- | --- | --- |
|  | 0 | 2 | 5 | 10 | 30 |
| Example 1 | 0 | 95.6 | 96.9 | 98.0 | 100 |
| Example 2 | 0 | 92.5 | 94.8 | 97.1 | 100 |
| Example 3 | 0 | 91.1 | 93.2 | 96.5 | 100 |
| Example 4 | 0 | 90.5 | 92.8 | 95.4 | 100 |
| Comparative Example 1 | 0 | 48.0 | 69.0 | 85.0 | 100 |
| Comparative Example 2 | 0 | 40.2 | 58.0 | 82.1 | 100 |
| Comparative Example 3 | 0 | 36.5 | 54.1 | 78.4 | 100 |
| Comparative Example 4 | 0 | 33.3 | 53.8 | 76.9 | 1.00 |

*Shows the % viscosity achieved.

In Examples 1 to 4, the degrees of binding of the xanthan gum and metal salts were high and, since the percentage of the surface of xanthan gum powder which had been modified was high, viscosities were developed with excellent dispersion properties for high percentages of xanthan gum, without the production of lumps under gentle stirring conditions, and with uniform dispersion and dissolution. In Comparative Examples 1 to 4, the degrees of binding of the metal salts were low, since the percentages of the surfaces of the xanthan gum powders which had been modified were low, the dispersibility was low, lumps were produced during stirring and the peak viscosities were reached after 30 minutes had elapsed.

Test Example 2

[Example of. Use in beverages and Foodstuffs] Using the xanthan-gum compositions manufactured in Examples 1 to 3, the French dressings for Examples 5 to 7 were manufactured in the proportions listed in Table 2. In all the Examples, viscosity developed and stabilized soon after simply mixing each of the raw materials and no changes in viscosity were observed 30 minutes after dissolution.

TABLE 2

|  | Example 5 | Example 6 | Example 7 |
| --- | --- | --- | --- |
| Xanthan gum composition | Example 1 = 0.5 | Example 2 = 0.5 | Example 3 = 0.5 |
| Vegetable Fat or Oil | 38 | 38 | 38 |
| Water | 37.5 | 37.5 | 37.5 |
| Granulated Sugar | 12 | 12 | 12 |
| Vinegar | 9 | 9 | 9 |
| Salt | 1 | 1 | 1 |
| Powdered garlic | 1. | I | 1 |
| Powdered mustard | I | 1 |  |
| Totals | 100 | 100 | 100 |

*Units: parts by weight

The present invention significantly reduces the time taken for xanthan gum to dissolve and, in addition, it is an invention which makes dissolution possible, without conventional dissolution operations requiring skill or special art or equipment in, for example, households.

The invention claimed is:

1. A method of treating a patient with difficulty in swallowing, the method consisting of:
   (i) adding a thickening composition to a beverage or foodstuff to form a thickened beverage or foodstuff, the thickened beverage or foodstuff consisting of the beverage or foodstuff and the thickening composition, and the thickening composition consisting of a powder consisting of a xanthan gum, a metal salt, and optionally at least one substance selected from the group consisting of guar gum, enzyme-degraded guar gum, carrageenan, karaya gum, sodium carboxymethylcellulose (CMC), sodium alginate, modified starch, and dextrin,
   wherein at least 0.5 parts by weight of the metal salt per 100 parts by weight of the xanthan gum are bound to the surface of the powder, and the metal salt is not potassium chloride, the metal salt selected from the group consisting of monopotassium citrate, tripotassium citrate, trisodium citrate, calcium lactate, and combinations thereof,
   the thickening composition is formulated such that addition of 1 part by weight of the xanthan gum, which is bound to the metal salt, to 99 parts by weight of ion-exchanged water at 20 ° C. disperses and dissolves the xanthan gum without forming any lumps, and 2 minutes after the addition the xanthan gum reaches at least 90% of its peak viscosity; and
   (ii) administering the thickened beverage or foodstuff to the patient.

2. The method of claim 1, wherein the metal salt was bound to the surface of the powder by spraying the metal salt solution onto the xanthan gum and thereafter subjecting the powder to fluidized drying.

3. The method of claim 1, wherein the metal salt bound to the surface of the powder is 0.5 to 10 parts per 100 parts by weight of the xanthan gum.

4. The method of claim 1, wherein the metal salt comprises calcium lactate.

* * * * *